United States Patent [19]

Rudness

[11] 3,975,568
[45] Aug. 17, 1976

[54] LOW-FRICTION, WEAR-RESISTANT MATERIAL AND PROCESS FOR MAKING THE SAME

[75] Inventor: Robert G. Rudness, Indianapolis, Ind.

[73] Assignee: Union Carbide Corporation, New York, N.Y.

[22] Filed: Oct. 30, 1974

[21] Appl. No.: 519,200

Related U.S. Application Data

[63] Continuation-in-part of Ser. No. 243,424, April 12, 1972, abandoned.

[52] U.S. Cl. .............................. 428/329; 428/331; 427/189; 427/191; 427/193; 51/297; 51/309 R; 51/309 A; 308/238; 156/279
[51] Int. Cl.² ........................................ B32B 15/08
[58] Field of Search ........... 161/162, 164, 158, 168, 161/165; 117/21, 23, 24; 51/401, 297–308, 309; 308/238; 156/279; 428/328, 329, 331, 144; 427/189, 191, 261, 193

[56] References Cited
UNITED STATES PATENTS

| 3,502,453 | 3/1970 | Baratto | 51/295 |
|---|---|---|---|
| 3,525,664 | 8/1970 | Hale et al. | 156/279 X |
| 3,661,544 | 5/1972 | Whitaker | 51/295 |
| 3,694,243 | 9/1972 | Campbell | 117/21 X |
| 3,836,345 | 9/1974 | Graham | 51/298 X |
| 3,841,852 | 10/1974 | Wilder et al. | 51/309 X |
| 3,879,175 | 4/1975 | Levitt | 29/182.5 |

*Primary Examiner*—Marion E. McCamish
*Assistant Examiner*—Patricia C. Ives
*Attorney, Agent, or Firm*—Dominic J. Terminello

[57] ABSTRACT

A composite material comprising substantially uniformly dispersed, tightly packed smooth spheres or spheroids embedded in a matrix with the size of the spheres or spheroids being between 10 and about 50 mesh USA Sieve size and the surface roughness of said spheres or spheroids being between 1 and about 70 microinches R.M.S.

4 Claims, No Drawings

LOW-FRICTION, WEAR-RESISTANT MATERIAL AND PROCESS FOR MAKING THE SAME

This application is a continuation-in-part of application Ser. No. 243,424, filed April 12, 1972 now abandoned.

FIELD OF THE INVENTION

This invention relates to a wear-resistant composite material for use in paper-making machinery. Specifically, the material consists of substantially uniformly dispersed spheroidal to spherical shaped particles, sized between about 10 and 50 mesh U.S.A. Sieve series embedded in a matrix so as to provide a substantially smooth surface void of any sharp projections.

DESCRIPTION OF THE PRIOR ART

In a Fourdrinier machine, a suspension of fibres or "stock" is discharged through an orifice onto a moving endless screen or "wire." The moving wire travels around and between a breast roll in the general location of the slice and a couch roll adjacent to the press section of the machine. Following the breast roll it is common in the art to lead the wire over one or more forming boards followed by a plurality of foil blades, suction boxes and other water removal components.

Synthetic fiber fabric wires are now being increasingly used for the wet end of the paper machine. These machine wires are now usually fabricated with spun or filament nylon yarn, polyester yarn, or any other suitable synthetic yarn. With the advent of faster machine speeds, the use of endless fabric wires has created a demand for improved paper-making machine component parts that come in contact with such wires.

Such parts require good resistance to abrasion characteristics while being compatible with the fabric wire if contacts so that fabric wear can be minimized. Components parts such as hydrofoils, suction box covers and forming boards, in addition to being subjected to contact resistance with moving endless type fabric belts, are contacted with water, abrasive materials added unintentionally along with the wood pulp, and other abrasive materials used to color and/or opacify the wood pulp while it is being transformed into paper. The endless fabric wires, which can be in excess of 300 inches wide, require rather large and somewhat complex mating component parts, such as hydrofoils. Initially, and still in many installations, polyethylene materials are used for mating parts. However, the polyethylene components wear out rapidly requiring frequent replacement, thereby raising operational costs.

Attempts have been made to make the foils of extremely hard materials, such as ceramics and carbides. These hard brittle materials cannot be economically fabricated into monolithic one-piece foils of the lengths desired. Even if fabricated, their brittleness would make the foils very susceptible to handling damage, during assembly or operation, especially in the operating environment of a paper making machine. It is possible to make the foil from several sections of monolithic ceramics, carefully machining and fastening the sections so there are no gaps or discontinuities at the joints. Such segmented foils are very expensive to fabricate and are susceptible to mechanical damage during assembly and operation. Sharp cutting edges resulting from mechanical damage of the brittle ceramic foils would cause rapid wear in the machine wire which then must be replaced. It should be noted that the cost of a machine wire is very high and its replacement involves stopping the paper machine, resulting in considerable economic losses.

It has also been proposed to reduce the foil wear by using segmented wear resistant inserts in appropriate places on a ductile foil substrate. Ceramic inserts, as generally known in the trade, are formed from solid blocks and are relatively expensive. These inserts also are susceptible to mechanical damage during foil insertion and operation. Paper streaking may occur if there is any gapping between segments which can occur from mechanical loads or stresses arising because of different thermal expansion of the ceramic inserts and foil substrates.

In addition, inserts may be made of one continuous piece of strong ductile metal which has been coated with a wear resistant ceramic oxide or carbide. The coated insert is then fastened to a suitable plastic base to form the foil. As an example, the insert could be formed of stainless steel, the coating may be cobalt bonded tungsten carbide and the plastic base a high density, high molecular weight polyethylene. These foils perform satisfactorily, but are very expensive and so have had only limited use.

Suction boxes differ from foils in that the drainage occurs when the water is sucked through the wire by applying a vacuum to the lower side of the wire. This is done by pulling the wire over a perforated surface cover through which the water is sucked. The geometry of the performation may vary from slots to holes. The material requirements for suction boxes are, in general, the same as desired for foil blades.

1. The box cover surface should have a low coefficient of friction to reduce the drag on the wire.
2. The surface must be initially smooth and remain smooth during operation so that no damage to the wire is caused by jagged surfaces.
3. The cover should be operational for long times in the warm corrosive environment of a paper machine.
4. The surface should be wear resistant since geometry changes because of surface wear limits the use lifetime of the cover.
5. The material must be capable of the formation of shapes with sharp edges or with small chamfers or radii of curvature.
6. It is preferable that the cover material be impact resistant (not brittle) so as to minimize handling damage during installation and during operations, such as cleaning.
7. It also is desirable that the selected material be made into suction box covers of the desired geometry by low cost simple fabrication techniques.

Commonly used materials for suction boxes are polyethylene or monolithic ceramic such as high aluminum oxide ceramics or silicon carbides. The polyethylene covers are satisfactory except their wear resistance is low requiring frequent replacement, and consequently, machine shutdown. Segmented ceramic cover plates have excellent wear properties, but are very expensive to fabricate in that precision grinding of both wear and mating surfaces must be done. Furthermore, the ceramic covers are susceptible to handling damage during installation and operation. If damage to the surface, especially mating surfaces of the ceramic cover plate occurs, a sharp cutting edge may be generated which then causes damage to the expensive wire requiring machine shutdown and wire replacement.

The use lifetimes of wear resistant components, such as suction box covers or foils, which contact machine wires or felts are determined by (a) dimensional changes caused by wear which reduce performance, such as drainage (b) localized damage to the component producing discontinuities in drainage causing streaking in the paper (c) increased drag on or damage to machine wires or felts leading to machine shutdown and component removal or (d) damage during handling by operating personnel. These factors impose a number of constraints upon the composition and structure of a wear resistant layer formed of small (less than 10 mesh USA sieve size) ceramic particles. The ceramic particles must not have sharp edge or rough surfaces since this can lead to wire or felt damage and high frictional drag forces. Furthermore, the ceramic particle should not develop sharp edges as it is worn down during operation. The particles should be of a shape where they are mechanically locked into the plastic matrix as well as adhesively bonded. The particle should be suitable for close packing so that a maximum amount of ceramic is at the wear surface. In addition, the particle should be of a shape which does not enhance surface fracture of the plastic matrix when the surface is under tensile stresses as may occur during handling operations.

The ceramic particles must be relatively uniform in diameter so that surface close packing arrangements can be achieved. The particle sizes should be such that about one-half of the particles effective volume is removed when the component has reached its useful life limit. In addition, the particles should be sufficiently small in diameter so that lips or edges can be formed with a radius of curvature less than about 0.050 inches. The matrix should be an impact resistant plastic which wets and bonds well to the ceramic particles. The ceramic particles and plastic matrix both should have long-time resistance to the warm (150°F) corrosive liquids encountered in paper making.

Ceramic spheres and spheroids with smooth surfaces best satisfy the particle shape requirements. It has been found that the surface roughness of the particles must be between 1 and about 70 microinches R.M.S. and preferably between about 1 and 10 microinches R.M.S. Provided the spheroids are not worn down to the median plane, they will not present cutting edges at the surface and they are mechanically locked in the plastic matrix. They can be closely packed, and minimal fracture enhancement because of the ceramic particle shape occurs at the wear surface during installation handling. The optimum spheroid size depends upon the specific paper machine component design, but will lie between 10 and 50 mesh USA sieve size.

The composite wear surface material described is especially suitable for blade foils and suction box covers used in paper making machines.

SUMMARY OF THE INVENTION

This invention relates to composite materials having wear-resistant surface. Specifically, the invention relates to a composite material comprising smooth spheroidal to spherical shaped wear-resistant particles substantially uniformly dispersed and tightly packed in a matrix the particles having a size in the range of 10 to 50 USA sieve size and surface roughness of between 1 and 70 microinches R.M.S. finish.

The criteria of the spheroidal particles are that they have wear-resistant characteristics, have a surface roughness less than 70 microinches RMS (root mean square average as defined on page 16 of Surface Texture bulletin ASA B46.1-1962 published by the American Society of Mechanical Engineers, New York N.Y.), be amenable to the particular fabric material intended to contact them in their designed application, such as nylon, polyester, acrylic, etc., and be sized between about 10 and 50 mesh USA sieve size. Preferably the surface roughness should be between about 1 and about 10 microinches RMS, and a preferable particle sizing should comprise particles sized between about 10 and about 30 USA sieve series. The particles may be, if desired, mixed with particles sized smaller than 270 mesh and larger than 600 mesh USA sieve size. The two particle sizes are desirable in some cases since the smaller size particles can fill the voids that exist between touching larger particles thereby yielding a higher volume density of the hard phase at the wear surface. Where surfaces are fabricated for components parts with a sharp leading edge, such as exist in hydrofoils, the smaller size particles can be used to increase the wear resistance of such edge since larger particles will not completely fill the sharp corner of the edge. Thus it is within the purview of this invention to have a portion of substantially small size particles of 270 to 600 mesh USA sieve size mixed with the remaining portion composed substantially of larger size particles sized between about 10 and about 50 USA sieve size. It is also within the purview of this invention to use particles of different sizes and proportions within the limits of the size range specified above as long as the surface roughnesses of the particles are less than 70 microinches RMS. The particular application of the part to be fabricated will determine the optimum size or sizes of the particles to be used.

Suitable wear-resistant particles for use in this invention include metal oxides, metal carbides, metal borides, metal nitrides and metal silicides in any combination of mixture thereof. Examples of some metal oxides include such compounds as alumina ($Al_2O_3$), chromium sesquioxide ($Cr_2O_3$), hafnium oxide ($HfO_2$), beryllium oxide (BeO), zirconium oxide ($ZrO_2$), yttrium xoide ($Y_2O_3$), rare earth oxides, and titanium dioxide ($TiO_2$) in any and all mixtures. Suitable metal carbides include silicon carbide (SiC), boron carbide ($B_4C$, hafnium carbide HfC), columbium carbide (CbC), tantalum carbide (TaC), titanium carbide (TiC), zirconium carbide (ZrC), molybdenum carbide ($Mo_2C$), chromium carbide ($Cr_3C_2$) and tungsten carbide (WC). Suitable metal borides include titanium boride ($TiB_2$), zirconium boride ($ZrB_2$), columbium boride ($CbB_2$), molybdenum boride ($MoB_2$), tungsten boride ($WB_2$), tantalum boride ($TaB_2$) and chromium boride (CrB). Suitable metal nitrides include silicon nitride ($Si_3N_4$), titanium nitride (TiN), zirconium nitride (ZrN), hafnium nitride (HfN), vanadium nitride (VN), niobium nitride (NbN), tantalum nitride (TaN) and chromium nitride (CrN). Suitable silicides include molybdenum silicide ($MgSi_2$), tantalum silicide ($TaSi_2$), tungsten silicide ($WSi_2$), titanium silicide ($TiSi_2$), zirconium silicide ($ZrSi_2$), vanadium silicide ($VSi_2$), niobium silicide ($NbSi_2$), chromium silicide ($CrSi_2$) and boron silicide ($B_4Si_2$). For clarity and illustrative purposes only, the invention will be mainly directed to the use of alumina particles as the wear-resistant particles although any of the particles listed above can be used successfully according to this invention.

The matrix or binder layer consists of a plastic material. The thickness of this binder layer should be at least about the diameter of the largest particles size, or the average particle size, so as to insure proper securement of the particles therein.

A coupling agent, known also as silane, and silicon adhesion promoters, may be added to the particle-binder mixture to increase the bond strength between the particles and the binder in the finished composite thereby providing a stronger composite. Examples of coupling agents admirably suited for this purpose include Vinyltriethoxysilane, beta-(3,4-Epoxycyclohexyl)-ethyltrimethoxysilane, gamma-Glycidoxypropyltrimethoxysilane, Vinyltriacetoxysilane, gamma-Aminopropyltriethoxysilane, N-beta-(Aminoethyl)-gamma-aminopropyltrimethoxysilane, or the like. An amount of the coupling agent up to about 2% by weight as based on the weight of the particles would be admirably suited for this purpose.

EXAMPLES

Alumina particles of various sizes from 270 USA sieve size and finer were produced by fusing boule powder by putting it through a Verneuil crystal-growing burner. The particles appeared substantially spherical in shape and were screened into different particle size ranges. Spheroidal alumina particles, sized larger than 270 USA sieve size were obtained from commercial sources. These particles, however, have to be subjected to a polishing step to bring the surface roughness to less than 70 micro-inches RMS.

EXAMPLE I

A mixture of 50% by volume of 28 to 32 USA sieve size spherical aluminum oxide particles and 50% by volume of thermosetting powder was placed in a die heated to 280°F. (148°C.) and held at a pressure of 6000 psi for 10 minutes. The die was 1 inch in diameter and 1⅛ inches long. After the 10 minute application of pressure at the elevated temperature, the die assembly was cooled to ambient temperature whereupon the molded part was removed from the die. The 1 inch diameter by 1⅛ inch long cylindrical molded part exhibited a surface of uniformly dispersed spheroidal alumina particles in the thermosetting resin.

EXAMPLE II

A monolayer of aluminum oxide particles sized between 28 and 32 mesh USA sieve size was placed in the bottom of a cylindrical shaped die cavity, measuring 1¼ inch diameter. A thermosetting resin powder was poured over the top of said particle layer and then molded as described in Example I. The molded part so produced consisted of a solid thermoset resin having a monolayer of alumina spheres on its surface.

EXAMPLE III

A hydrofoil prototype part for a Fourdrinier machine was fabricated by bending a metal (aluminum) sheet into a substantially channeled shaped configuration having a 42-inch length, 2½ inch width and 1¼ inch legs. The leading edge on the width dimension surface was bent upward by about 2° from the surface and the leg thereat was curved to yield and aerodynamic type configuration. Thus, as a fabric belt or the like rides over such a hydrofoil in a width-wise direction from the leading edge to the trailing edge, a differential pressure is established which suctions the liquid and other chemicals passing through the belt onto the trailing segment of the hydrofoil surface, thus drying the wood pulp or paper on top of the belt.

The longitudinal ends of the so-formed hydrofoil were covered with aluminum foil so as to form a closed channel mold with an opening at the top. 500 grams of spheroidal alumina particles sized 28 to 32 mesh USA sieve size was added to 600 grams of epoxy resin. The composite was slowly mixed as the particles were added so as to minimize the formation of bubbles in the mixture. The epoxy was very viscous and when and/if bubbles were formed, they came slowly to the surface. 60 grams of a liquid epoxy hardener was added to the mixture and the composite was further mixed whereupon it was poured into the hydrofoil mold. An additional batch of 600 grams of epoxy resin and 60 grams of liquid epoxy hardener was mixed and poured on top of the first mix. The composite was allowed to set for 24 hours. The spheroidal particles sank to the bottom of the mold and the final product produced was a foil shape having an upper surface composed of specifically sized spheroidal particles embedded in an epoxy matrix.

A slight warpage occurred during curing due to the difference in the shrinkage between the epoxy sphere layer and the pure epoxy layer. The composite produced, however, was sufficiently flexible to be straightened out to its desired shape.

EXAMPLE IV

A hydrofoil mold was prepared as described in Example III except that the mold was machined from steel. The dimensions of the cavity were 17¼ inch long by 2½ inches wide by 1⅜ inches deep. A T-shaped core was provided to be placed in the cavity so that a T-shaped groove could be imparted to the part being molded. The mold was surface cleaned and then sprayed with a fluorocarbon release agent. The mold was assembled and a small vibrator machine, designed to vibrate at 60 hertz was attached to it.

A mix of 250 grams resin, 28 grams of epoxy hardener, 3 drops of silicone wetting agent, and 356 grams of 30–50 mesh USA sieve size aluminum oxide balls was prepared and then poured into the mold while it was vibrating. A second mix of 250 grams of epoxy resin, 20 grams of epoxy hardener and 3 drops of silicone wetting agent was prepared and 200 grams of this composition was poured on top of the first mixture in the vibrating mold. The T-shaped core bar was submerged into the epoxy and attached to the mold at its ends. The composite after being room cured for 24 hours was removed and exhibited a good hydrofoil shape with good particle distribution.

EXAMPLE V

The hydrofoil mold and T-shaped core of EXample IV was used for this example. The mold was surface cleaned and then sprayed with fluorocarbon release agent. A mix of 250 grams of epoxy resin, and 20 grams of epoxy hardener was stirred for 15 minutes. With the mold attached to a 60 hertz vibrator, the epoxy mix was poured into the mold and then 350 grams of 28 to 32 mesh USA sieve size aluminum oxide particles were poured on top of the epoxy mix. The T-core bar was embedded in the mold and then a second epoxy mixture, as prepared above, was deposited into the mold between the inside surface of the mold and the T-shape core. The mold assembly was cured at room temperature for 24 hours and the composite was then removed. The hydrofoil produced exhibited a surface having a good particle distribution but the surface particle density was less than that produced in Example IV. Also the surface of the hydrofoil exhibited less bubbles than the hydrofoil surface of Example IV.

EXAMPLE VI

The surfaces of a mold, having internal dimensions of 3 inches by 1 inch by ¾ inch high, was cleaned and then sprayed with fluorocarbon release agent. 16.6 grams of 30–50 mesh USA sieve size aluminum oxide particles were poured into the mold which was attached to a 60-cycle vibrator. 9.8 grams of 270 mesh USA sieve size and finer aluminum oxide particles was deposited into the mold and onto the first layer of particles while the mold was vibrating. A mix of 30 grams of epoxy resin, 3.3 grams of epoxy hardener, 22 drops of a silane coupling agent and 0.78 grams of blue pigment was stirred for 10 minutes and then poured into the mold. The mixture in the mold was cured at room temperature and then the composite part was removed. The surface of the part exhibited good particle distribution with the smaller size particles substantially filling the spaces between the larger size particles.

Materials were also fabricated using chromium oxide particles, tungsten carbide-chrome-nickel particles, tungsten carbide-cobalt particles and chrome carbide-nichrome particles. Like the examples above, the particle distribution on the surface of these composites was good.

Having described the invention with reference to certain preferred embodiments, it should be understood that minor modifications can be made without departing from the spirit and scope of this invention as defined by the claims.

What is claimed is:

1. A material for use in contacting moving Fourdrinier paper machine synthetic fabric forming wires comprising substantially uniformly dispersed spheroidal to spherical shaped wear resistant particles embedded in a plastic matrix and said particles forming a tightly packed monolayer which forms a wear surface, said plastic matrix being formed from a plastic taken from the class consisting of thermoplastic and thermosetting resins and said particles being selected from at least one of the group consisting of metal oxides, metal carbides, metal borides, metal silicides and metal nitrides with said particles being sized between about 10 and about 50 mesh USA sieve size with a surface roughness between 1 and about 70 microinches RMS.

2. Material according to claim 1 wherein smaller particles in the range of 270 to 600 mesh USA sieve size are mixed in with said 10 to about 50 mesh USA sieve size particles.

3. Material according to claim 1 wherein said particles are alumina particles.

4. Material according to claim 1 wherein said surface roughness is between 1 and 10 microinches RMS.

* * * * *